United States Patent
Wernick et al.

(10) Patent No.: US 9,198,525 B2
(45) Date of Patent: Dec. 1, 2015

(54) WEARABLE CARRIER AND METHOD OF CARRYING A CHILD OR ANIMAL

(71) Applicants: Aviva Wernick, Hollywood, FL (US);
Yitzie Wernick, Hollywood, FL (US);
Michal Chesal, Hollywood, FL (US);
Brian Chesal, Hollywood, FL (US)

(72) Inventors: Aviva Wernick, Hollywood, FL (US);
Yitzie Wernick, Hollywood, FL (US);
Michal Chesal, Hollywood, FL (US);
Brian Chesal, Hollywood, FL (US)

(73) Assignee: BABY K'TAN, LLC, Hollywood, FL (US)

( * ) Notice: Subject to any disclaimer, the term of this patent is extended or adjusted under 35 U.S.C. 154(b) by 79 days.

(21) Appl. No.: 13/776,116

(22) Filed: Feb. 25, 2013

(65) Prior Publication Data

US 2013/0298844 A1    Nov. 14, 2013

Related U.S. Application Data

(63) Continuation of application No. 11/756,388, filed on May 31, 2007, now abandoned.

(51) Int. Cl.
*A47D 13/02*  (2006.01)
*A61G 1/01*  (2006.01)
(Continued)

(52) U.S. Cl.
CPC ............... *A47D 13/02* (2013.01); *A01K 29/00* (2013.01); *A47D 13/025* (2013.01); *A61G 1/01* (2013.01); *A61G 7/1023* (2013.01)

(58) Field of Classification Search
CPC ............... A47D 13/025; A47D 13/02; A45F 2003/025; A45F 3/04; A45F 3/02; A61G 1/01; A61G 7/1023; A01K 29/00
USPC .................................. 224/158, 160, 259, 627
See application file for complete search history.

(56) References Cited

U.S. PATENT DOCUMENTS

| 770,761 A | 9/1904 | Lemly |
| 781,033 A | 1/1905 | Sutter |

(Continued)

FOREIGN PATENT DOCUMENTS

| JP | 09019347 | 1/1997 |
| JP | 09206182 | 8/1997 |

(Continued)

OTHER PUBLICATIONS

International Search Report issued by the Korean Intellectual Property Office dated Dec. 14, 2007 for related PCT Application No. PCT/US2007/013120.

*Primary Examiner* — Justin Larson
*Assistant Examiner* — Peter Helvey
(74) *Attorney, Agent, or Firm* — Troutman Sanders LLP; Ryan A. Schneider; Christopher C. Close, Jr.

(57) ABSTRACT

A child or animal carrier and a method of carrying a child or animal on the user's body are described in this invention. The carrier has two loops 1, 2 joined together by a connecting device with an optional sash. The method of carrying the child or animal involves wearing the loops 1, 2 and placing the child or animal in the loops 1, 2 in a variety of positions. In certain positions the child is carried vertically on the front of the user's torso and either faces the same direction as the user or faces inward toward the user's torso; or the child is carried vertically on the user's back facing toward the user's back. In other positions, a child or animal can be fully or partially cradled in the loops 1, 2. In another position, the child or animal is slung in the loops 1, 2 and carried against the user's hip or at the front of the user's torso. The connecting device allows the user to adjust the position of the loops 1, 2 for comfort and back support. In addition, the optional sash can be used to provide additional security for the child, and added comfort and support for the user and child. The carrier is easy to use and designed for the comfort of the user and comfort and security of the child or animal.

18 Claims, 12 Drawing Sheets

(51) Int. Cl.
  *A61G 7/10* (2006.01)
  *A01K 29/00* (2006.01)

(56) References Cited

U.S. PATENT DOCUMENTS

| | | | |
|---|---|---|---|
| 2,132,556 A | 10/1938 | Blackshaw | |
| 4,273,215 A | 6/1981 | Leggett | |
| 4,333,591 A | 6/1982 | Case | |
| 4,436,233 A | 3/1984 | Hill et al. | |
| 4,458,834 A | 7/1984 | Rosen | |
| 4,481,682 A * | 11/1984 | Hall | 2/326 |
| 4,544,088 A | 10/1985 | Reding | |
| 4,579,264 A | 4/1986 | Napolitano | |
| 4,724,987 A | 2/1988 | Maheu | |
| 4,757,925 A | 7/1988 | Knittel | |
| D306,655 S | 3/1990 | Schlegel Liebert | |
| 4,941,604 A | 7/1990 | Nagareda | |
| 5,056,869 A | 10/1991 | Morrison | |
| 5,064,108 A | 11/1991 | Headley | |
| D332,865 S | 2/1993 | Wilmink | |
| 5,215,239 A | 6/1993 | Walters, Jr. | |
| 5,307,967 A | 5/1994 | Seals | |
| 5,329,884 A | 7/1994 | Bell | |
| 5,348,205 A | 9/1994 | Steurer | |
| 5,490,620 A | 2/1996 | Bergqvist | |
| 5,497,923 A | 3/1996 | Pearson et al. | |
| 5,632,425 A | 5/1997 | Hull | |
| 5,676,426 A | 10/1997 | Herring | |
| 5,678,739 A | 10/1997 | Darling et al. | |
| 5,857,598 A | 1/1999 | Dunne | |
| D411,039 S | 6/1999 | Reimers et al. | |
| D411,666 S | 6/1999 | Reimers et al. | |
| D412,396 S | 8/1999 | Reimers et al. | |
| 5,950,887 A | 9/1999 | Powell | |
| 5,961,014 A | 10/1999 | Knerr | |
| 5,988,098 A | 11/1999 | Hillhouse | |
| 6,112,960 A | 9/2000 | Seering et al. | |
| 6,152,342 A | 11/2000 | Suk | |
| 6,167,844 B1 | 1/2001 | Cantrell et al. | |
| 6,213,362 B1 | 4/2001 | Lorenzini et al. | |
| 6,311,884 B1 | 11/2001 | Johnson | |
| 6,520,391 B2 | 2/2003 | Yen | |
| 6,595,396 B2 | 7/2003 | Cummings et al. | |
| 6,647,928 B1 | 11/2003 | Spiller | |
| 6,659,971 B2 | 12/2003 | Gaylord | |
| 6,672,493 B1 | 1/2004 | Fair et al. | |
| 6,736,299 B2 | 5/2004 | Bergkvist | |
| D490,938 S | 6/2004 | Wydner | |
| 6,763,983 B2 | 7/2004 | Norman | |
| 6,836,902 B2 | 1/2005 | Marquez et al. | |
| 6,959,455 B2 | 11/2005 | Hall | |
| 6,988,644 B1 | 1/2006 | Asherbranner | |
| 7,070,076 B2 | 7/2006 | Bergkvist | |
| 7,178,632 B2 | 2/2007 | Casebolt et al. | |
| 7,673,945 B1 | 3/2010 | Riffel et al. | |
| D614,861 S | 5/2010 | Smyth et al. | |
| D630,838 S | 1/2011 | Gmeiner et al. | |
| 8,925,772 B2 * | 1/2015 | Vukovics | 224/160 |
| 2002/0175194 A1 | 11/2002 | Norman | |
| 2003/0047573 A1 | 3/2003 | Bergkvist | |
| 2003/0178452 A1 | 9/2003 | Norman | |
| 2004/0020951 A1 | 2/2004 | Bergkvist | |
| 2007/0029356 A1 | 2/2007 | Moriguchi et al. | |

FOREIGN PATENT DOCUMENTS

| | | |
|---|---|---|
| JP | 3107804 | 2/2005 |
| JP | 3115985 | 10/2005 |

* cited by examiner

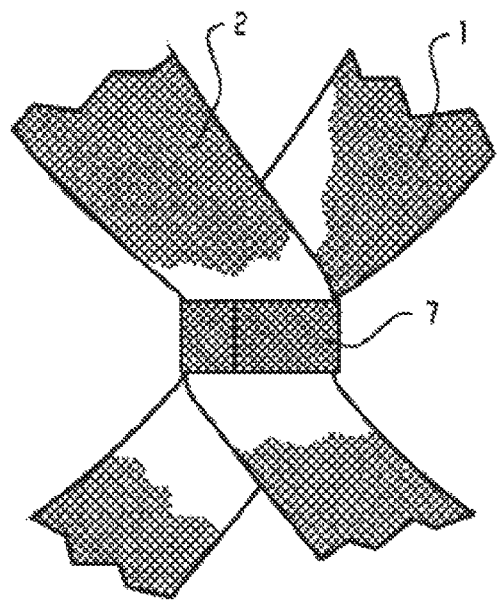
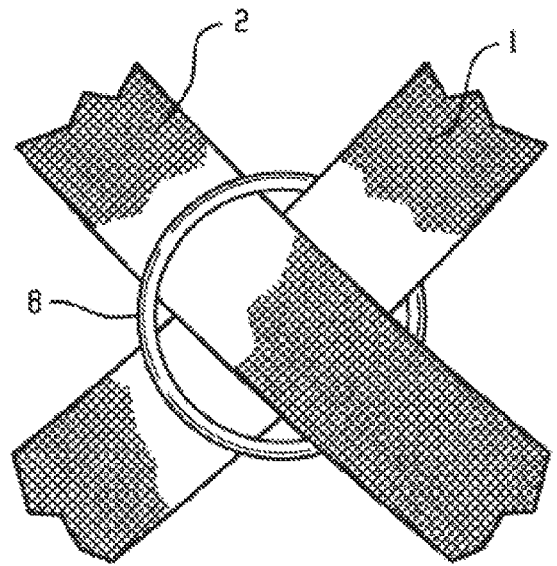
Fig. 4A
Fig. 4B
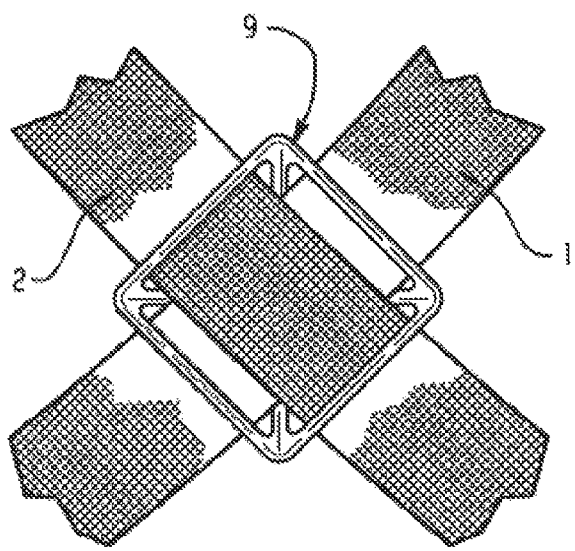
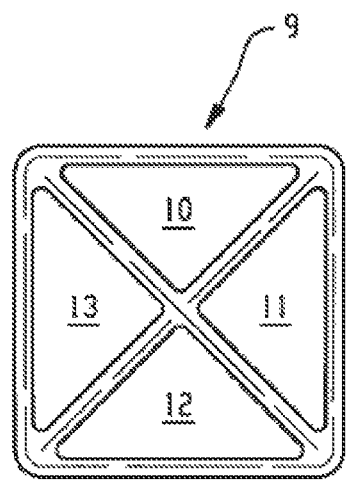
Fig. 4C
Fig. 4D

WEARABLE CARRIER AND METHOD OF CARRYING A CHILD OR ANIMAL

CROSS-REFERENCE TO RELATED APPLICATIONS

This application is a continuation application claiming priority to U.S. patent application Ser. No. 11/756,388, filed 31 May 2007, which claims priority to U.S. Provisional Patent Application Ser. No. 60/803,741, filed on 2 Jun. 2006, and U.S. Provisional Patent Application Ser. No. 60/867,233, filed on 27 Nov. 2006, all of which are hereby incorporated by reference in their entirety.

BACKGROUND OF THE INVENTION

1. Field of the Invention

The invention pertains generally to devices or apparatus for carrying items, and more particularly to wearable carriers designed to carry, transport and support small children or animals.

2. Description of Related Art

Carrying infants, small children or animals comfortably and securely is a problem faced by nearly all parents, caregivers and pet owners. Holding a child or pet can be difficult if the child or pet is heavy. Even holding a small, light child or pet is difficult when long periods of time are involved such as in outings to the store, walks, trips to friends or relatives, visits to the doctor, running errands, plane travel, visiting zoos or museums, dining out, or simply carrying a child or animal with you around the house.

Child Carriers

To ease the burden, slings and other wearable child carriers have been employed to hold and transport infants and small children. In fact, the use of fabric shoulder slings dates back to prehistoric times, with various improvements over the years, such as adding a solid shelf support for the hip (U.S. Pat. No. 781,033); making the length-adjustment buckle more secure (U.S. Pat. No. 5,857,598); refining the pouch (U.S. Pat. No. 4,757,925); adding a stabilizing hip belt to the sling (U.S. Pat. Nos. 4,544,088, 4,724,987, and 4,436,233); and various other refinements.

Carrying an infant or child is highly recommended by pediatricians and child development specialists, and is promoted in pediatric and child development books and publications. Studies have shown that carrying an infant or child in a carrying device on the user's body is beneficial for the child's development and security and for parent-child bonding. Carrying infants in a soft sling-like carrier on the user's body provides a womb-like feeling in which they can snuggle securely to the sound of the adult's heartbeat, and often soothes cranky or colicky infants. Wearing infants or small children facilitates sleeping or resting, and enables parents or caregivers to attend to some of their normal daily activities and tasks while carrying their children hands-free. Some sling-like carriers allow a mother to nurse her child discreetly while carrying him/her. Moreover, children who are carried in a baby carrier upright facing out can receive visual and sensory stimulation by observing the world around them, while at the same time being comfortably carried by a parent or caregiver.

Today, wearable child carrying devices fall into the following basic categories: (i) structured front and back carriers, (ii) hip carriers, (iii) slings, (iv) wraps, and (v) others. The claimed invention falls into the "other" category as it has the benefits of structured carriers, hip carriers, wraps and slings, yet overcomes the disadvantages of those carrying devices.

(i) Structured front and back carriers: Structured front carriers, like the various BabyBjorn® carriers, allow the user to carry an infant or child on the front of the user's torso in a vertical inward-facing or outward-facing position. Structured back carriers, such as one described in U.S. Pat. No. 4,333,591, allow the user to carry a child on the user's back in a vertical position facing the user's back. Some structured back carriers are essentially backpacks with a compartment or seat in which the child is placed. These structured carriers are typically adjustable devices made up of a triangular, rectangular or non-uniform piece of material with openings for the child's legs, providing a seat-like structure for the child. The seat-like device is typically connected to straps by means of hooks, snaps, zippers, buckles and/or other attaching devices. For front carriers, the seat-like device is worn at the front of the user's torso, and the straps typically go over the user's shoulders and cross at the user's back. For back carriers, the seat-like device is worn at the back of the user's torso, and the straps typically go over the user's shoulders, much like a back-pack.

There are numerous disadvantages to structured front and back carriers. First, the material of the carrier is often hard, canvas-like, bulky and/or cumbersome, which is not comfortable on the child's body or for the user. The bulkiness is problematic because it renders the carrier difficult to carry around, pack and/or store. It also adds visual "weight" to the user, which is particularly undesirable for women, especially women who have recently given birth. Second, these carriers have limited positions, only providing vertical carrying positions. Back carriers do not accommodate infants and young children. Rather, they are typically for toddlers and children who can sit up unassisted. Moreover, most infants prefer to be carried in a comfortable cradle-like position, which facilitates sleeping, resting or nursing. Structured front and back carriers do not provide such positions. Structured front or back carriers also do not provide a hip position. Third, structured front and back carriers have a wide area of material (usually hard or bulky material) between the child's legs, separating the child's legs. Studies have shown that during the early stages of children's development, when their joints are forming and developing, young children, especially children with hypotonia (low muscle tone), can be adversely affected by carriers that place their legs in excessive abduction (legs too far apart). Fourth, the straps are not comfortable on the user's shoulders and/or back. Finally, most structured carriers employ hardware, such as snaps, buckles, zippers, clasps or other plastic or metal connecting devices. These devices make putting a child in and taking a child out of the carrier complicated. These devices also have the potential for mechanical failure, are unattractive, and often render the carrying device not washing machine or dryer safe.

Other drawbacks to backpack-type carriers are as follows. They are difficult for one person to use. Since the compartment for the child is on the back, if one person is wearing the backpack, another individual is required to place the child in the compartment. For a single person to place the child in the carrier, the backpack has to be removed and placed on the ground. Then, the child has to be placed in the compartment. Lastly, the person must maneuver to mount the backpack on his/her back without tipping the carrier and having the child fall out. Another disadvantage is that since the child is on the person's back, there is no intimate contact between the child and user. More importantly, it is very difficult to monitor the child's activity.

(ii) Hip carriers: Hip carriers like The Hiphugger® (U.S. Pat. No. 6,595,396), are typically made up of straps or material that fall over one of the user's shoulders, forming a sling-like pouch or seat for the child to sit in at the user's hip, with the child's weight on the user's hip, and the child's legs straddling both sides of the user's hip. Some hip carriers employ devices to adjust the length of the straps or material, and to adjust the width or tightness of the pouch-like seat. Some hip carriers also include an additional strap which encircles the user's waist.

Hip carriers have at least the following significant disadvantages. First, it only provides one seat-like position at the user's hip. It does not provide a horizontal cradle-like position preferred by infants and children for resting, sleeping or nursing. Nor does it provide vertical inward or outward facing positions at the front or back of the user's torso (see structured front and back carriers above), which allow the child to snuggle against the front of the user's body or to face outward at the front of the user's body. Second, hip carriers are limited to older children who can sit up unassisted; they are not suitable for infants. Moreover, hip carriers do not provide sufficient security for a child of any age. In fact, the instructions for hip carriers often require or recommend that the user have his/her arm encircled around the child at all times for safety. Accordingly, the hip carrier does not allow for hands-free carrying of a child. Third, hip carriers go over one of the user's shoulders, placing the weight load on the user's shoulder, thereby resulting in neck and/or shoulder pain. Fourth, hip carriers do not cross at the user's back and thus do not distribute some of the weight load to the back and do not provide the user with back support. Fifth, hip carriers are often made of uncomfortable, hard and/or bulky fabric and/or straps. Sixth, hip carriers often employ hardware, such as snaps, buckles, zippers, clasps or other plastic or metal connecting devices. These devices are uncomfortable for the user and the child, have the potential for mechanical failure, are unattractive, complicated to use, and often render the carrying device not washing machine or dryer safe. Finally, for those hip carriers that attach to the user by means of the user tying the ends of the fabric, the knot or tie may come undone and is therefore not safe and secure.

(iii) Slings: The basic over-the-shoulder sling is typically a loop of material that falls across one of the user's shoulders and under the opposite arm. Some slings are simply made out of a long rectangular piece of fabric that is tied together by the user to form a loop. Some slings employ rings, buckles, snaps, clasps or other connecting devices to attach the two ends of the fabric together to form a loop. Some slings have the ends sewn or otherwise attached together to form a non-adjustable loop of fabric. Some slings are tapered to form a pouch in the center of the material for the child to lay or sit in.

Slings have at least the following significant disadvantages. First, all slings go over only one of the user's shoulders, placing the weight load on the one shoulder, thereby resulting in neck and/or shoulder pain. Second, slings do not cross at the user's back and therefore do not distribute some of the weight load to the back and do not provide the user with back support. Third, slings only provide limited positions for carrying an infant or child, such as the cradle-like position, a semi-cradle position where the child is seated more upright in the sling, and a hip carry position. Slings do not provide vertical inward or outward facing positions on the front of the user's body, nor vertical inward facing position on the back of the user's body. Fourth, slings do not provide sufficient security for infants or children. Infants or children are merely cradled in one piece of fabric and can easily fall or slip out of the fabric, especially when the user bends over. In fact, older children who are seated in the fabric without any other securing material or device can jump or otherwise push themselves out of the carrier. Fifth, some slings are made out of uncomfortable, bulky and/or padded fabric. Sixth, adjustable slings have a significant amount of fabric, which is not only hot and uncomfortable for the user and child, but often results in a long unattractive "tail" of fabric hanging at the end. Seventh, many slings employ hardware, such as snaps, buckles, rings, clasps or other plastic or metal connecting devices. These devices are uncomfortable for the user and the child, have the potential for mechanical failure, are unattractive, and often render the carrying device not washing machine or dryer safe. Finally, for those slings that attach by means of the user tying the ends, the knot or tie may come undone and is therefore not safe and secure.

(iv) Wraps: Wraps are typically a long rectangular piece of fabric, like a long scarf, that is wrapped and tied around the user and the infant or child in order to carry the infant or child in a variety of positions. Some wraps employ rings, buckles or other connecting devices at the end of the fabric to attach the ends of the material.

While wraps offer a variety of carrying positions, including cradle, semi-cradle, vertical front and back positions, and hip carry, they have at least the following disadvantages. First, wraps are difficult and complicated to put on and take off. It is difficult for a user to quickly, easily and safely wrap the material around his/her body and the child while holding the child, especially since many children are restless, squirm and/or move around. It is similarly difficult to quickly, easily and safely remove the child from the wrap. Second, although wraps can be wrapped around the user to cross at the user's back, there is no device or means for adjusting the cross of the fabric at the user's back. In other words, the cross of fabric at the user's back can not be easily adjusted—moved up or down—by the user to assure that the cross is properly positioned for optimal back support and a comfortable fit about the user. Third, wraps have a significant amount of fabric, which is not only hot and uncomfortable for the user and child, but often results in a long unattractive "tail" of fabric hanging at the end. Fourth, for those wraps that attach by means of the user tying the ends, the knot or tie may come undone and is therefore not safe and secure. Fifth, some wraps employ hardware, such as rings, buckles or other connecting devices. These devices are uncomfortable for the user and the child, have the potential for mechanical failure, are unattractive, and often render the carrying device not washing machine or dryer safe.

(v) Others: There are a few wearable carrying devices, which do not fall squarely within one of the above categories. One such carrier is described in Netherlands Patent No. 1,006,025. The patent shows a baby carrier comprised of two separate loops of fabric that are worn together by the user. This carrier has at least the following three disadvantages. First, the two sling-like loops are not connected, thereby making it difficult for the user to easily put on the carrying device. Moreover, because the carrier is made up of separate pieces, there is the potential for one of the pieces to be easily misplaced or lost. Second, the carrier does not provide a device or means for the user to adjust the cross of the loops at the user's back unassisted, in order to ensure that the loops are properly positioned on the user's back for optimal back support and a comfortable fit about the user. Third, the carrier does not include a sash, and thus does not provide sufficient security when a child is placed in the carrier in a vertical position on the front or back of the user's torso with the material crossing under the child's bottom to form a seat. Without a sash, the child can shift to one or the other sides of the user's body or can slip out of the carrying device.

Another similar carrier being marketed is the My Baby Nest Carrier™. This carrier is comprised of two loops of fabric, with one loop sewn through the other loop thereby intertwining the two loops. This carrier has at least the following four disadvantages. A first being that the carrier is constructed from stretch fabric—the material content is 10% Lycra and 90% cotton—which does not provide adequate support for carrying a child. The carrier has too much elasticity/stretch, and as a result, it does not accommodate the weight load that it is meant to hold. When a child is placed in the carrier, the child sinks and bounces rather than being steadily supported and remaining in place. Second, it does not provide a device or means for the user to adjust the cross of the loops at the user's back unassisted, in order to ensure that the loops are properly positioned on the user's back for optimal back support and a comfortable fit about the user. Third, the width of each loop is too narrow and does not provide a sufficient amount of material to create a pocket-like device for cradling an infant or child. In the cradle position, there should be at least a few centimeters of material on either side of the child's body so that the child is securely cradled within the carrier. Accordingly, the narrow width of the material renders the carrier unsafe in certain positions, and uncomfortable for the child. Fourth, while the carrier does include a sash, the sash employs two plastic rings for connecting the ends of the sash. Such device can be uncomfortable for the user and the child, has the potential for mechanical failure, is unattractive, and may render the carrying device not washing machine or dryer safe.

Another similar carrier is the Loopi Baby Carrier. Like the Netherlands carrier described above, the Loopi is comprised of two separate loops of fabric, except the Loopi also includes a separate sash. Accordingly, the Loopi is comprised of three separate pieces, meant to be worn together to carry a child. The Loopi is made out of cotton and elastic fabric. It has similar disadvantages as those described above. Like the Netherlands carrier, the loops are not connected, making it difficult to put on the carrying device, and because it is not a connected device, one or more pieces of the carrier may become lost or misplaced. Like the My Baby Nest carrier, the material is too elastic and therefore does not provide adequate support for carrying a child. Finally, like both the Netherlands and My Baby Nest carriers, it does not provide a device or means for the user to adjust the cross of the loops at the user's back unassisted, in order to ensure proper back support and a comfortable fit.

Pet Carriers

Small to medium sized animals and pets, such as dogs, cats and other four-legged pets, similarly enjoy and benefit from being carried in a wearable carrier by their caregiver or pet-owner. It helps foster attachment and security, which is important for all pets, and even more so, for new pets, puppies or kittens, as new pets suffer anxiety when they are weaned from their first "parents" and come to live in a new home. Wearing an animal or pet is also useful for disabled (i.e., three-legged), elderly, very young or sick animals, or for taking smaller or slower pets on walks that would have trouble keeping up with their owners or their owners' larger pets. Carrying animals or pets is also useful in inclement weather (snow, rain etc.) or when the weather is too hot, making it difficult for animals to walk and/or keep up with their owners. There are limited options, however, for carrying pets. The most common are pet carriers that are comprised of a small cage with a door and a handle. Bags, which have handles or shoulder straps, are also available for transporting pets. Such bags either have an open design or form an enclosure or netting confining the animal.

There are several disadvantages to these type of pet carriers. They are uncomfortable to hold for extended periods of time. Cage-type carriers and bags with handles do not allow for hands-free carrying of pets. Bags that have shoulder straps are uncomfortable for the user in that the weight load rests on the user's shoulder, resulting in shoulder or neck pain, and no back support. Cage-type carriers are especially heavy, large, cumbersome and bulky. In addition, confinement in enclosed bags or cage-type carriers cause pets to become distressed, agitated, and noisy. Open-design bags do not adequately secure animals, and as a result the animal can fall out or escape. Other disadvantages to cage and bag carriers is that there is no intimate contact between the animal and the user, and all cage and most bags are not machine washable.

A few of the child carriers listed above have been marketed or used in recent years for carrying small animals as well. The disadvantages outlined in the child carrier section above apply equally to carrying animals. In addition, animals, such as dogs or cats, are not comfortable being held with their legs spread apart. Accordingly, structured front and back carriers and hip carriers which require the pets' legs to be placed in leg openings or otherwise separate their legs, are not comfortable for animals.

Therefore, there remains a need for a wearable, washable and safe child and/or pet carrier that is portable; allows for hands-free carrying; is easy to use, put on and take off unassisted; provides a wide variety of carrying positions; is comfortable for the child or animal and the user; properly distributes the weight of the child or animal, providing optimal back support for the user; and provides adequate support and security for the child or animal. It is to the provision of such a carrier that the present invention is primarily directed.

SUMMARY OF THE INVENTION

Briefly described in preferred form, the present invention is a wearable carrier for a child or animal and methods for carrying a child or animal. The construction and method of using the carrier are major improvements over conventional means of carrying and transporting children or animals.

An exemplary embodiment of the present invention comprises two loops of fabric coupled by a connecting device. The loops are worn by the user across the user's torso in a crisscross fashion. The connecting device joins the two loops by wrapping around the loops in the area where the loops crisscross on the user's back, enabling the connecting device to slide up or down the loops, enabling the user to adjust the place where the loops cross at the user's back without assistance from another person. Additionally, a sash can be tied around the user's torso, over the two loops, for added comfort and security in various carrying positions. The loops are constructed from a fabric material, thus the carrier is lightweight. The fabric loops are comfortable for the user and child/animal, easy to wash, dryer safe, and can be conveniently folded, transported and stored.

The method of carrying a child is executed by employing a carrier worn by a user. A child is placed in one or both loops of the carrier. Optionally, a sash is tied around the torso of the user over the loops to better secure the child to the user's body and to provide the user with added back support. The method can also be employed for carrying an animal.

An exemplary embodiment allows the user to carry the child vertically in a forward facing or inward facing position. In one method for achieving this position, the user may place both loops over his/her head and around his/her neck like a necklace (with the support band at the back of the neck). The user separates the loops and places one arm through the first loop, and the second arm through the second loop. The user may lower the outer loop (the one farthest from user's body)

from his/her shoulder so that it hangs around the waist. The child is held securely against the user's torso, facing outward, or in other exemplary embodiments, such as the inward facing position, the child may face the torso of the user. The user stretches open the fabric of first loop between the child's legs and over the child's shoulder. The user raises the outer loop from his/her waist back onto the opposite shoulder, so that it lies between the child's legs and over the child's opposite shoulder. The user adjusts the fabric between the child's legs so that it forms a comfortable and secure seat. The soft fabric between the child's legs, however, is typically not more than five centimeters (about two inches) wide, and as a result, the child's legs are not unnaturally spread apart. This position creates an X of fabric holding the child against the user. The carrier falls across the user's shoulders and the child's shoulders, front and between the child's legs. The user can adjust the support band by reaching behind his/her back and sliding the support band up or down so that the loops cross at the center of the user's back for optimal back support. The user can optionally tie a sash around his her waist and around the child for added security in carrying the child and added back support for the user. The sash may be tied in a single knot at the user's front, side or back, or can be double wrapped and tied. The vertical positions may also be use for carrying animals, such as small to medium-sized pets.

The above vertical inward and outward facing positions, as well as the positions described below, can be achieved by other means than those described above. For example, to start, the user need not place both loops over his/her head and around his/her neck. Rather, he/she can skip to the second step by placing one loop over his/her shoulder and under the opposite arm, and placing the second loop over his/her opposite shoulder and under the other arm. Similarly, the user need not then lower the outer loop to his/her waist, and can instead place the child directly within the two loops allowing the cross of fabric at the front of the user's torso to form a seat and stretching the fabric of each loop between the child's legs and over the child's torso and shoulders. Another alternative for achieving various carrying positions is for the user to start with both loops around the user's waist, and then hold the child at the front of his/her torso, raising one loop in between the child's legs and onto the user's shoulder. The user then similarly raises the other loop onto his/her opposite shoulder.

Another exemplary embodiment allows the user to carry the child in a full cradle-like or partial cradle (i.e., seated) position at the front of the user's torso. The loops form a full or partial cradle for carrying the child. To achieve this position, the user places both loops over his/her head like a necklace (with the support band at the back of neck). The user next separates the loops and places one arm through one loop, and the other arm through the second loop. The user lowers the outer loop (the one farthest from the body) from the shoulder so that it hangs around the waist. The user stretches open the inner loop at the center of the body so that it forms a pocket or cradle. The child is placed in the center of the pocket with his/her head toward the user's shoulder, and his/her legs toward the user's waist. The fabric of each loop is wide enough that an infant or child can be securely cradled within one loop. The fabric should not cover child's face. The child should be centered in the width of the fabric with an equal amount of fabric on each side of his/her body, so that the child is securely cradled within the width of the fabric. In other contemplated embodiments, such as the partial cradle position, the child may be placed in the pocket in a more upright seated position with his/her head and one or both arms free and unsupported by the loops. The outer loop is then pulled back onto the user's opposite shoulder. The fabric of the outer loop is spread over the child's back and legs. The user may then reach behind his/her back and slide the support band up or down so that the loops cross at the center of the user's back for optimal back support. In the full cradle position, the infant or small child's legs are typically enveloped within the loops of fabric. In the partial cradle position, however, one or both of the child's legs may be free of the fabric, with the loops forming a seat for the child and his/her legs dangling out of the fabric. The full and partial cradle positions may also be employed for carrying an animal, such as a small or medium-sized pet.

In another exemplary embodiment of the cradle position for animals, both loops may be placed over one of the user's shoulder's and under his/her opposite arm to form a sling-like cradle position for carrying animals. To achieve this position, the user may place both loops over one shoulder and under his/her opposite arm so that the loops lay diagonally across the front and back of the user's torso, with the support band at the back of the user's torso, and with one loop layered over the other loop. The user then stretches open the fabric of the loops so that it forms a pocket or cradle. The animal is placed in center of the pocket in an upright seated position with his/her body either facing outward or inward toward the user's body, and with the animal's legs within the fabric. This sling-like cradle position may also be used for a child or infant, but is not preferred for reasons of safety for the child and comfort for the user, including lack of back support.

In another exemplary embodiment, the two loops form a seat for the child at the user's hip and the child is supported against the user's hip. To achieve this position, the user may place both loops over one shoulder and under his/her opposite arm so that the loops lay diagonally across the front and back of the user's torso, with the support band at the back of the user's torso, and with one loop layered over the other loop. The user then stretches open the fabric of the loops at his/her side so that is forms a hammock-like seat. Holding the child securely, he/she is placed in the carrier with his/her legs hanging out of carrier and straddling the user's side. The fabric of the inner loop (closest to the user's body) is adjusted so that it forms a comfortable and wide hammock-like seat for the child. The outer loop (farthest away from the user's body) may be pulled up over the child's back so that the carrier hugs the child more securely to the user's body, and provides neck support for younger children. The child's shoulders and one or both arms may be free of the fabric. A sash may be tied around the user and child for added security and back support if so desired. The sash may be tied in a single knot at the user's front, side or back, or it may be double wrapped and tied around the user and child. This position may also be employed for carrying a small animal, however, it is more comfortable for the animals' legs to remain within the loops of fabric, rather than dangling out of the loops and straddling the user's side.

In an alternate exemplary embodiment of the hip position, after the user places the child in the hammock-like seat at the side of his/her body, the user can then stretch open the outer loop and place it between the child's legs, rather than merely under the child's bottom as is the case with the inner loop. This provides added security in that the child has a seat from the first loop and in addition, is secured to the user by means of the second loop crossing between the child's legs, so that the child cannot slip out of the seat.

In another alternate exemplary embodiment of the hip position, the user may achieve this position by placing the loops on his/her body and placing the child in the loops by the same means for the vertical inward facing position described above. Accordingly, the loops of fabric cross between the child's legs forming a seat for the child. The user may then shift the position of the child from the center of his/her torso to his/her side so that the child is straddling the user's hip. The sash may then be tied around the user and child. In this alternate embodiment of the hip carry position, the loops are on both of the user's shoulders, and cross at the user's back so that the child's weight does not solely rest on the user's shoulder, but is distributed to the back as well. Moreover, the user can utilize the support band to adjust where the loops cross at his/her back for optimal back support. In addition, the fabric crosses between the child's legs, rather than forming a hammock-like seat at the user's side.

In another embodiment for carrying a child, the user may carry the child vertically in an inward facing position at the user's back, whereby the two loops form a seat for the child at the user's back. In one method for achieving this position, the user may place both loops over his/her head like a necklace (with the support band at the front of the neck). The user separates the loops and places one arm through the first loop, and the second arm through the second loop, with the support band at the front of the user's torso where the two loops cross. The user may lower the outer loop (the one farthest from user's body) from his/her shoulder so that it hangs around the waist. A second person is needed to securely place the child in the carrier at the user's back. The fabric of the first loop is stretched open so that the child is placed on the user's back, with the fabric of one loop between the child's legs and over the child's back and shoulder. The outer loop is then raised from the user's waist back onto his/her opposite shoulder, so that it lies between the child's legs and over the child's back and opposite shoulder. The fabric creates an X at the user's back and between the child's legs, holding the child against the back of the user's torso. The fabric between the child's legs may be adjusted so that it forms a comfortable and secure seat. The soft fabric between the child's legs, however, is typically not more than five centimeters (about two inches) wide, and as a result, the child's legs are not unnaturally spread apart. The carrier should now fall across the user's shoulders and the child's shoulders, back and between the child's legs. The user can adjust the support band so that it is centered at the front of his torso. The user can optionally tie a sash around his her waist and around the child for added security in carrying the child and added back support for the user. The sash may be tied in a single knot at the user's front, side or back, or can be double wrapped and tied.

These and other features as well as advantages, which characterize various exemplary embodiments of the present invention, will be apparent from a reading of the following detailed description and a review of the associated drawings.

BRIEF DESCRIPTION OF THE DRAWINGS

FIG. 4a illustrates an exemplary embodiment of the present invention, wherein the connecting device is a lumbar support band.

FIG. 4b illustrates an exemplary embodiment of the present invention wherein the connecting device is a ring.

FIG. 4c illustrates an exemplary embodiment of the present invention wherein the connecting device is an adjuster.

FIG. 4d illustrates the adjuster depicted in FIG. 4c.

DETAILED DESCRIPTION OF PREFERRED EMBODIMENTS

Figure 1A:
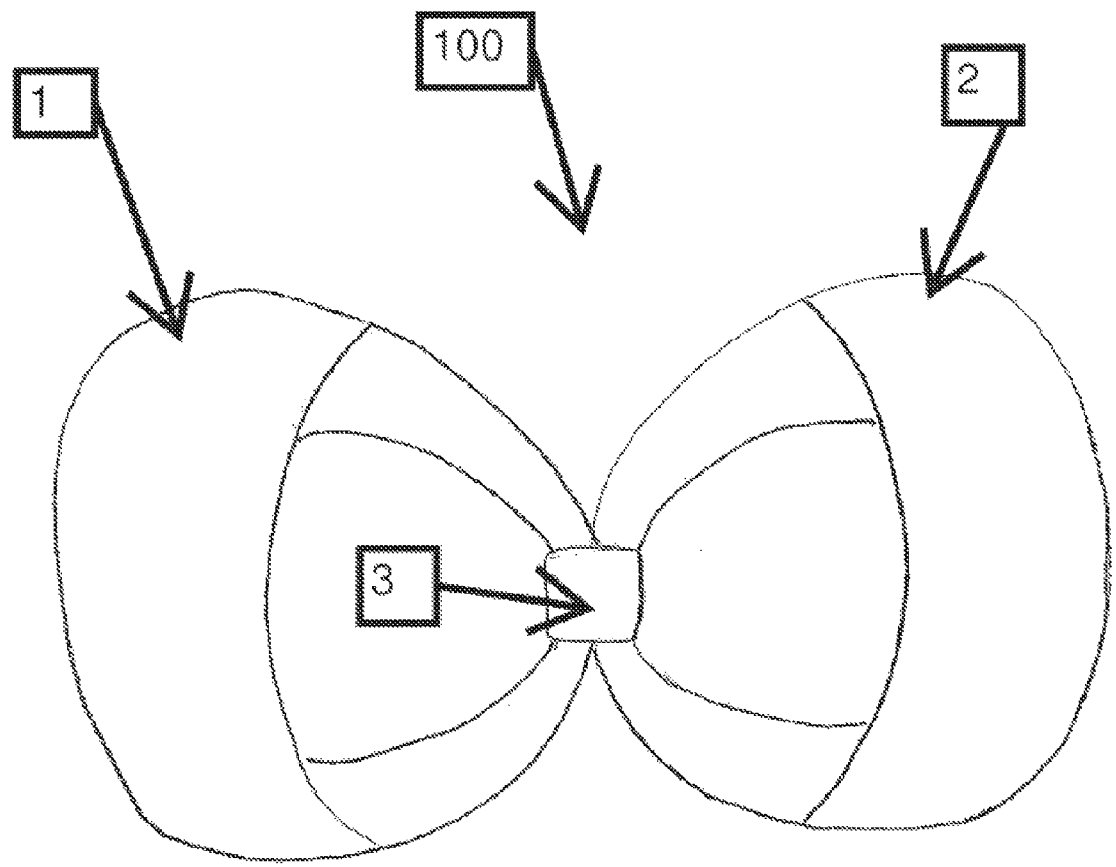
FIG. 1a illustrates a carrier according to a preferred embodiment of the present invention.

The present invention is a carrier and method of using a carrier to carry a child or animal. The carrier is wearable by a user, such as the parent of the child or the owner of the pet. It is a unique, stylish, and innovative carrier that is, in essence, a cross between a sling and a more structured front or back carrier, providing the benefits of wearable carriers, and avoiding the disadvantages of those carriers. The carrier is easy to use, has no bulky padding and requires no wrapping. It also does not require any buckles, clasps, snaps, rings, buttons or other metal or plastic hardware, although other embodiments could employ such devices. The carrier is designed to hold the child in a variety of positions from birth to approximately 40 pounds. The carrier is highly portable. It is preferably constructed of fabric, such as cotton, so that it is lightweight and can be easily folded, stored or transported. The fabric construction is machine washable and dryer safe, allowing for easy cleaning. In addition, the soft fabric carrier and/or sash can also serve other functions, such as a diaper changing pad or a blanket to cover the child. The carrier is also adjustable for comfortable wear by the user as well as proper support for the child or animal.

The carrier comprises two loops. The double loop design adds more security and comfort than offered in conventional designs. Each loop is worn over one of the user's shoulders and underneath the opposite arm in most carrying positions; whereas, both loops are worn over one shoulder and under the user's opposite arm for the hip position and the sling-like cradle position described above. The loops cross over each other in both the front and back of the user's torso in most carrying positions. In the back, the loops are joined by a movable/sliding connecting device, preferably a support band of fabric, but may be another metal, plastic or material connecting device. The support band joins the loops at the point at which the loops cross over each other.

The support band can slide to the optimal point on the user's back to evenly distribute the weight of the child or animal for greater back support. By sliding the support band up or down, the position of the crossover of the loops along the user's back can be adjusted. This provides for a more comfortable fit by allowing the user to select how high or low the user desires to carry the weight on his/her back. Adjusting the support band also allows for changing the position of the loops depending on the weight being carried or the desired carrying position.

The carrier can also include a sash or belt. The sash is wrapped around the waist of the user and secures the child. The sash passes over the waist, back, or bottom of the child and under the child's arms. The sash provides a snug, secure fit preventing the child from sliding out sideways from the loops or shifting to one side of the user's body, making it uncomfortable for the user and/or child. The sash can also provide neck support when carrying infants or small children who do not have sufficient neck control. The sash need only be used when the child is held in certain positions.

There are several exemplary embodiments of the method of using the carrier. Two preferred embodiments allow for a child to be held vertically at the user's torso either facing the user or with his/her back to the user. In these positions, each loop passes across one of child's shoulders, across the torso, and between the legs. Unlike other carriers in which there is a rigid or wide piece of material between the child's legs, typically 10 centimeters (about four inches) wide or more; the present invention employs loops that are preferably made of soft fabric, which is gathered together between the child's legs so that the width of fabric is typically not more than five centimeters (about two inches) wide. The present invention thereby ensures that the child's legs are not unnaturally spread apart, which is especially important for young children whose joints are still forming. A sash can be worn as described above to further secure the child in this method of use and for added back support to the user.

Another two exemplary embodiments allow for a child to be fully or partially cradled in the loops. In these positions, the child is placed in a pocket formed by one of the loops. The other loop is adjusted to further support the child. In the full cradle position, the child's head, torso, arms, and legs are all supported in the pocket of one or both of the loops. In the partial cradle position, the child's head and one or both of the child's arms are free to move, and not enclosed within the loops. In the partial cradle position, one or both of the child's legs or feet may be free of the fabric. The child may be facing inward toward the user in this position with his/her legs straddled around the front of the user's torso, or may be facing outward with his/her feet or legs within the loops of fabric, or dangling out of the fabric. The sash may be used in the cradle or partial cradle positions for added security, comfort and back support. These exemplary embodiments may also be employed for carrying an animal.

For the cradle positions, the inner loop may be worn so that it falls across the user's right shoulder, and the infant or child is then placed in the inner loop with his/her head at or near the right side of the user's chest close to the user's right shoulder. The carrier can be worn in the inverse position as well, so that the inner loop falls on the user's left shoulder, with the infant or child's head at or near the left side of the user's chest. The user may alternate the child's position, adding to the user's and the child's comfort.

In another exemplary embodiment of the cradle position for animals, both loops may be worn over one of the user's shoulder's and under his/her opposite arm to form a sling-like cradle position for carrying animals at the front of the user's torso. The loops are stretched open to form a pocket at the front of the user's torso and the animal is placed in center of the pocket with his/her body either facing outward or inward toward the user's body, and with the animal's legs within the fabric. This sling-like cradle position may also be used for a child or infant, but is not preferred.

Another exemplary embodiment allows for the child to be supported in the loops against the user's hip. In this hip position both of the loops are worn across the same shoulder and underneath the opposite arm. The child is placed in and supported by both of the loops, with the loops forming a seat for the child. In the alternative, the user can stretch open the outer loop and place it between the child's legs, so that the child is seated in the inner loop, and the outer loop further secures the child by resting between the child's legs. In the hip position, the child's legs straddle the user's side. The sash may be used in the hip position for added security, comfort and back support. This exemplary embodiment may also be employed for carrying an animal, however, an animal's legs need not straddle the user's sides; rather, the animal's legs remain within the loops of fabric at the user's hip.

In an alternate exemplary embodiment of the hip position, the user may achieve this position by placing the child in the loops by the same means for the vertical inward facing position described above. Accordingly, the loops of fabric rest on each of the user's shoulders, and cross between the child's legs forming a seat for the child. The user may then shift the position of the child from the center of his/her torso to his/her side so that the child is straddling the user's hip. The sash may then be tied around the user and child.

In another embodiment for carrying a child, the user may carry the child vertically in an inward facing position at the user's back, whereby the two loops form a seat for the child at the user's back. The user can optionally tie a sash around his her waist and around the child for added security in carrying the child and added back support for the user. The sash may be tied in a single knot at the user's front, side or back, or can be double wrapped and tied.

Referring now to the Figures, FIG. 1a illustrates the components of the carrier 100. The primary components are a first loop 1 and a second loop 2. The loops 1, 2 are constructed from a light weight material. The preferred material is fabric, and the preferred fabric is cotton knit, because of its lightweight, comfort to wear, ease of laundering, sturdy weave and optimal amount of stretch. Other fabrics could include mesh, breathable hi-tech fabric (such as dri-weave), cotton blends, wool, neoprene and other synthetic, natural or organic materials. Other fabrics may also include UV protection, antimicrobial elements, or may be usable in water (such as for carrying a child or animal at the beach). The loops 1, 2 can be produced in a variety of colors and stylish prints for both men and women. The fabric selected preferably should be safe to wash in a conventional washing machine and dryer, adding to the convenience of maintaining the carrier 100.

Each loop can be formed from a long rectangular piece of fabric. In an exemplary embodiment, the ends of the rectangle are sewn together to form a loop with one seam. In an exemplary embodiment, the seam is reinforced on the inside with a ribbon or is reinforced with double stitching to ensure that the seam is sturdy. The weave of the fabric or material should be selected such that the rectangular piece of fabric has a limited amount of stretch, if at all, lengthwise, and has equal or more stretch along its width. Lengthwise stretch should be minimized to prevent the child or animal from bouncing or sagging in the loops 1, 2. Widthwise, some stretch is desired so that the loops 1, 2 can be stretched to envelop, cradle and support the child or animal. The width of the loops 1, 2 is preferably between 55-70 centimeters (21.6-27.5 inches). The preferable amount of stretch of the cotton knit in the length of each loop is between 5-15%, with an equal or more amount of stretch in the width of each loop. It is important that the fabric not stretch too much in the length, as can be seen with other carriers, which employ some Lycra or Spandex to the material content, because such stretchy fabric does not provide sufficient support and security for a child or animal.

In the preferred embodiment, the loops 1, 2 are not adjustable. Rather, the carrier comes in various sizes, such as small, medium, large, extra-large and other sizes. The carrier is sized in accordance with female and male user's top sizes. It is designed to fit the user and child or animal snugly and securely without the need for adjustments. The carrier is designed to fit as the child grows. The knit of the fabric stretches over the user and child's bodies, allowing the user to wear small children from birth to approximately 18 kilograms (about 40 pounds).

In alternate embodiments, each loop is formed by an oblong, tapered or non-uniform piece of fabric. In addition, in alternate embodiments, each loop may be seamless so that it comes off the loom or knitting machine as a loop of material and need not be sewn at the ends to form a loop. In other alternate embodiments each loop may be adjustable so that it is not sewn together, but rather is connected by snaps, buttons, hooks, zippers, clasps, Velcro or some other connecting device, and each loop can thereby be adjusted to fit the user.

While the exemplary embodiment does not contain any pockets, attachments or accessories; alternate contemplated embodiments of the invention could include (i) pockets for carrying and storing cell phones, keys, diapers, wipes or other items, (ii) an attached sack or pouch for such items, (iii) an incorporated wipe dispenser, (iv) a hook or loop of material to which keys, a carabiner or other items can be attached, or (v) other accessory devices.

The first loop 1 and the second loop 2 are joined by a connecting device 3. The loops 1, 2 pass through an aperture in the connecting device 3. The first loop 1 and second loop 2 are free to slide through the aperture relative to each other and the connecting device 3. The connecting device 3 is capable of sliding up and down loops 1, 2 along the user's back. A purpose of the connecting device 3 is to enable the user to easily, without assistance from another person, reach one arm behind his/her back to adjust where the first loop 1 and second loop 2 to crisscross on the user's back for optimal back support and comfort.

Figure 1B:
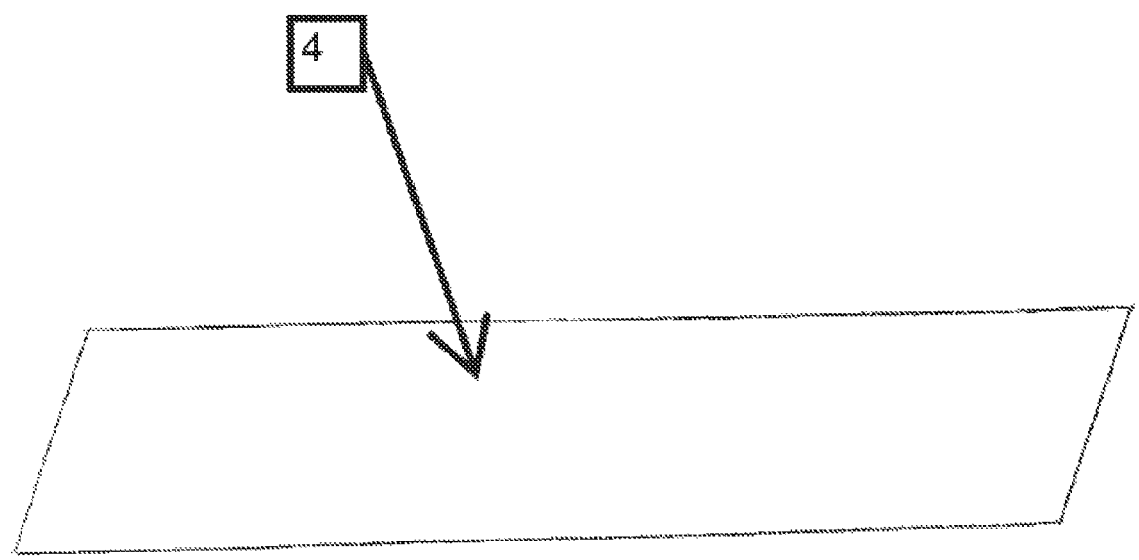
FIG. 1b illustrates a sash according to various embodiments of the invention.

FIG. 1b illustrates a sash 4 according to various embodiments of the invention. The sash 4 is preferably rectangular in shape. In contemplated embodiments, the sash is preferably substantially identical in width and length and material to the piece of fabric used to construct loops 1, 2. The ends of the sash 4, however, are not sewn together to form a loop. In other contemplated embodiments, the sash may be formed from different material and comprise different dimensions from the loops 1,2. In preferred embodiments, the length of the sash 4 is sufficient to completely wrap around the user and child once, with sufficient excess length to tie the ends into a knot. In other contemplated embodiments, the sash 4 may be of a length sufficient to wrap around the user and child more than once.

Figure 2:
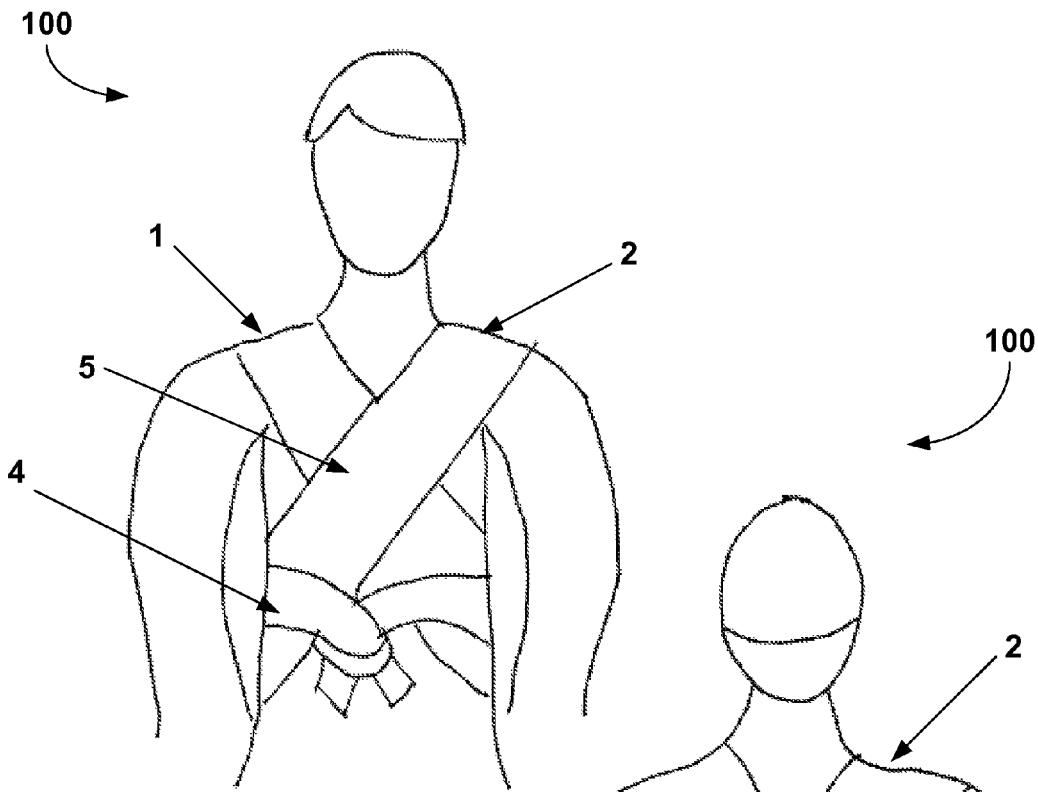
FIG. 2 illustrates a front view of an exemplary embodiment of a carrier of the present invention worn by the user.

FIG. 2 illustrates a front view of a carrier 100 as worn by a user. The first loop 1 and second loop 2 are worn across the torso in a crisscross fashion. The first loop 1 passes over the user's right shoulder and underneath the left arm. The second loop 2 passes over the left shoulder and underneath the right arm. The loops 1, 2 further cross over one another. As shown, the second loop 2 crosses over the first loop 1. The area where the loops 1, 2 crisscross is designated as the front overlap region 5. A sash 4 can also optionally be worn across the user's torso. The position of the sash 4 along the torso and relative to the loops 1, 2 is selected by the user based on comfort in which the position the child or animal is being held. The sash 4 is preferably constructed from the same material as the loops 1, 2. In other contemplated embodiments, the position of the loops 1, 2 can be reversed. For example, the first loop 1 can pass over the user's left shoulder and under the right arm, while the second loop 2 passes over the right shoulder and under the left arm. In further contemplated embodiments, the orientation of loops is reversible. For example, in the front and rear overlap regions, the first loop 1 could crossover on top of the second loop 2 and vice-a-versa.

Figure 3:
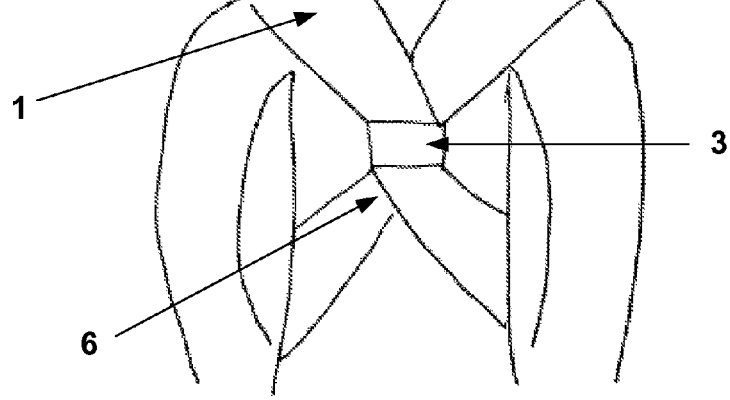
FIG. 3 illustrates a back view of the user of FIG. 2.

FIG. 3 illustrates the back view of the carrier 100 as worn by a user of FIG. 2. The area where the first loop 1 and second loop 2 crisscross is designated as the rear overlap region 6. It is at the rear overlap region 6 that the connecting device 3 slidingly joins the first loop 1 and second loop 2. The rear overlap region 6 is illustrated as being in the center of the user's back. However, the user can slide the connecting device 3 up or down along the first loop 1 and second loop 2 in order to adjust where the rear overlap region 6 falls on the user's back. This allows the user to select which part of the user's back carries the majority of the weight of the child or animal for proper back support and comfort. Because the connecting device 3 can slide along the loops 1, 2, the position of the rear overlap region can be adjusted without unduly shifting the loops 1, 2 and disturbing the child or animal. If the loops 1, 2 were sewn together or otherwise securely attached, as in prior art designs, the rear overlap region 6 could not be adjusted without shifting the loops 1, 2 as well and likely disturbing the child or animal.

FIGS. 4a-d illustrate exemplary embodiments of the connecting device 3. FIG. 4a illustrates a design wherein the connecting device 3 is a support band 7. Preferably, the support band 7 is constructed from the same fabric or material as the loops 1, 2. The support band 7 can be formed from a rectangular piece of fabric or material with the ends sewn together to form a loop. The seam of the support band 7 is depicted by the dashed line. The support band is wrapped around and joins the first loop 1 and the second loop 2. The support band 7 can be constructed from a variety of fabrics and materials and can be rigid or elastic. Alternate support bands or connecting devices may include one or more rings, buckles, snaps, buttons, clasps, Velcro, zippers or other metal, plastic or fabric connecting device which wraps around or otherwise joins the two loops. The support band 7 preferably wraps around the loops 1, 2 horizontally as depicted in FIG. 4a. However, the support band could also wrap around the loops 1, 2 vertically, or in other orientations. In the preferred embodiment, the support band is a small loop of fabric, the same or similar to the fabric of the loops, which wraps around the loops 1, 2 and is sewn together at the ends, preferably with a reinforced seam. Alternate forms of such support band, however, may include an adjustable band that is not sewn together at the ends, but rather opens and closes. Such alternate support band may attach by means of snaps, buttons, Velcro, zippers, hooks, buckles or other connective devices. In addition, alternate embodiments may include a connecting device, instead of a support band. Such connecting device may not wrap around the loops 1, 2, but would still slide or otherwise adjust on loops 1, 2. A support band 7 constructed from relatively soft material adds to the comfort of the user, since there are no hard pieces that could create pressure points on the user's back.

FIG. 4b illustrates a design wherein the connecting device 3 is a ring 8. The loops 1, 2 are slidingly joined by passing through the ring. The ring 8 is preferably circular, however, it can be square, elliptical or other shapes, so long as an opening is present for both loops 1, 2 to pass through. The ring 8 is preferably plastic or metal, however, wood, rubber or other materials may be used as well.

FIG. 4c illustrates a design wherein the connecting device 3 is an adjuster 9. The adjuster 9 comprises several apertures through which the loops 1, 2 pass, providing relative slip-free adjustment not readily provided for in a band 7 or a ring 8. Preferably, the adjuster comprises four apertures, depicted in the FIG. 4d as a first aperture 10, second aperture 11, third aperture 12, and fourth aperture 13. Preferably, the second loop 2 passes through the first aperture 10 and the third aperture 12. The first loop 1 passes through the second aperture 11 and fourth aperture 13. The adjuster 9 can have fewer or more than four apertures. The adjuster 9 can be constructed of the same materials as described for the construction of the ring 8. The design of the adjuster 9 is such that when a child or animal is placed in the loops 1, 2, the weight generates tension that presses the loops 1, 2 against the adjuster 9, and themselves, to avoid slipping. However, the user can manipulate the adjuster 9 and slide it along the loops 1, 2.

The present invention is also directed to a method of using a carrier 100.

Figure 5:
FIG. 5 illustrates an exemplary embodiment of a method of the present invention for carrying a child in a vertical forward facing position.
Figure 6:
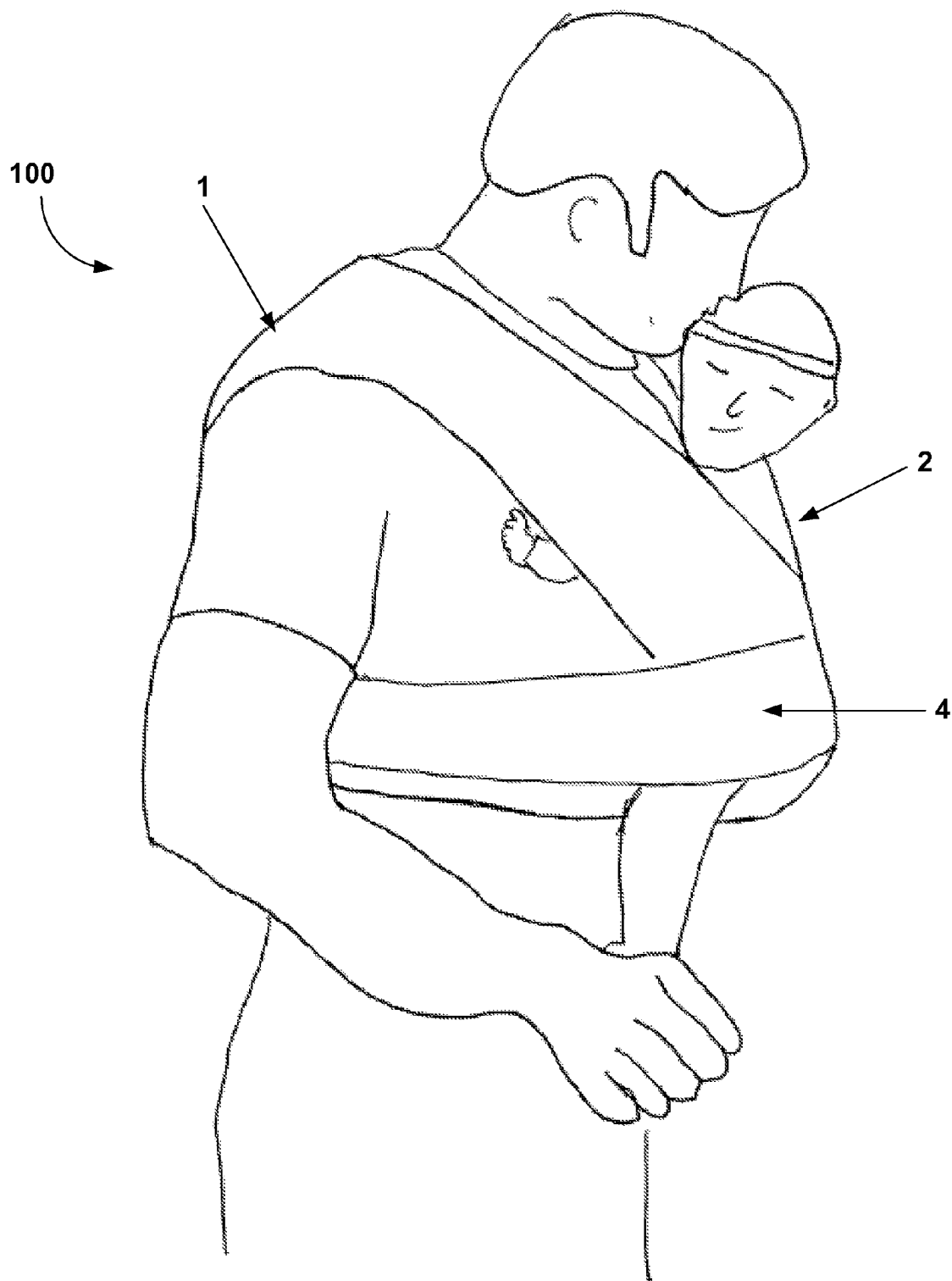
FIG. 6 illustrates an exemplary embodiment of a method of the present invention for carrying a child in a vertical inward facing position.

FIGS. 5 and 6 illustrate two positions of a child that can be accomplished by executing the methods of the present invention. FIG. 5 illustrates the child in a forward facing vertical position on the front of the user's torso. This position can be referred to as the adventure position.

To accomplish this position, the user starts by placing the first loop 1 across the right shoulder and underneath the left arm. The user next places the second loop 2 across the left shoulder and underneath the right arm. Placement of loops 1, 2 may also be alternated so that loop 1 falls across the left shoulder, and loop 2 falls across the right shoulder. The loops 1, 2 should crisscross each other in the front and back of the user's torso. The loops 1, 2 should be worn such that the connecting device 3 is on the user's back. A child is next placed in the loops 1, 2 with the child facing outward. The child is placed such that the first loop 1 passes over the child's right shoulder and between the child's legs. The second loop 2 passes over the child's left shoulder and between the child's legs. The loops 1, 2 of the present invention do not unnaturally spread the child's legs apart because the loops are made of soft fabric, rather than rigid material, and such fabric can be gathered together between the child's legs so that the fabric is typically approximately five centimeters (about two inches wide), and the child's legs are thus not spread apart. This is important in young children whose joints are still forming, where spreading the legs awkwardly could result in malformation of the child's joints or hips. It is especially important for infants and older children with hypotonia (low muscle tone), as spreading the child's legs apart can adversely affect such condition. Optionally, a sash can be tied around the user's torso and the child to snuggly secure the child and prevent him/her from slipping out between the loops 1, 2. This position allows for the user to comfortably carry the child hands-free, while the child is free to observe its environment and receive sensory and visual stimulation from the world around him/her. This position is preferably employed when the child is able to hold his/her head upright unassisted.

FIG. 6 illustrates a position wherein the child is held at an inward facing vertical position. This position is achieved in a substantially similar manner as the position in FIG. 5. However, the child is placed in the loops 1, 2 facing the user's torso. The first loop 1 passes over the child's left shoulder, across his/her back, and between his/her legs. The second loop 2 passes over the child's right shoulder, across his/her back, and between his/her legs. Placement of loops 1, 2 may also be alternated so that loop 1 falls across the right shoulder, and loop 2 falls across the left shoulder. The optional sash 4 can also be used to secure the child. This position allows the child to listen to the user's heartbeat and rest or sleep comfortably by leaning forward and resting his/her head on the user's chest or torso. This position is preferably employed when the child is able to hold his/her head upright unassisted, however, it may also be used for infants who cannot hold his/her head upright unassisted by using the sash 4 for head/neck support. The sash 4 may be placed around the infant's upper back and neck and then around the user's torso.

Figure 7:
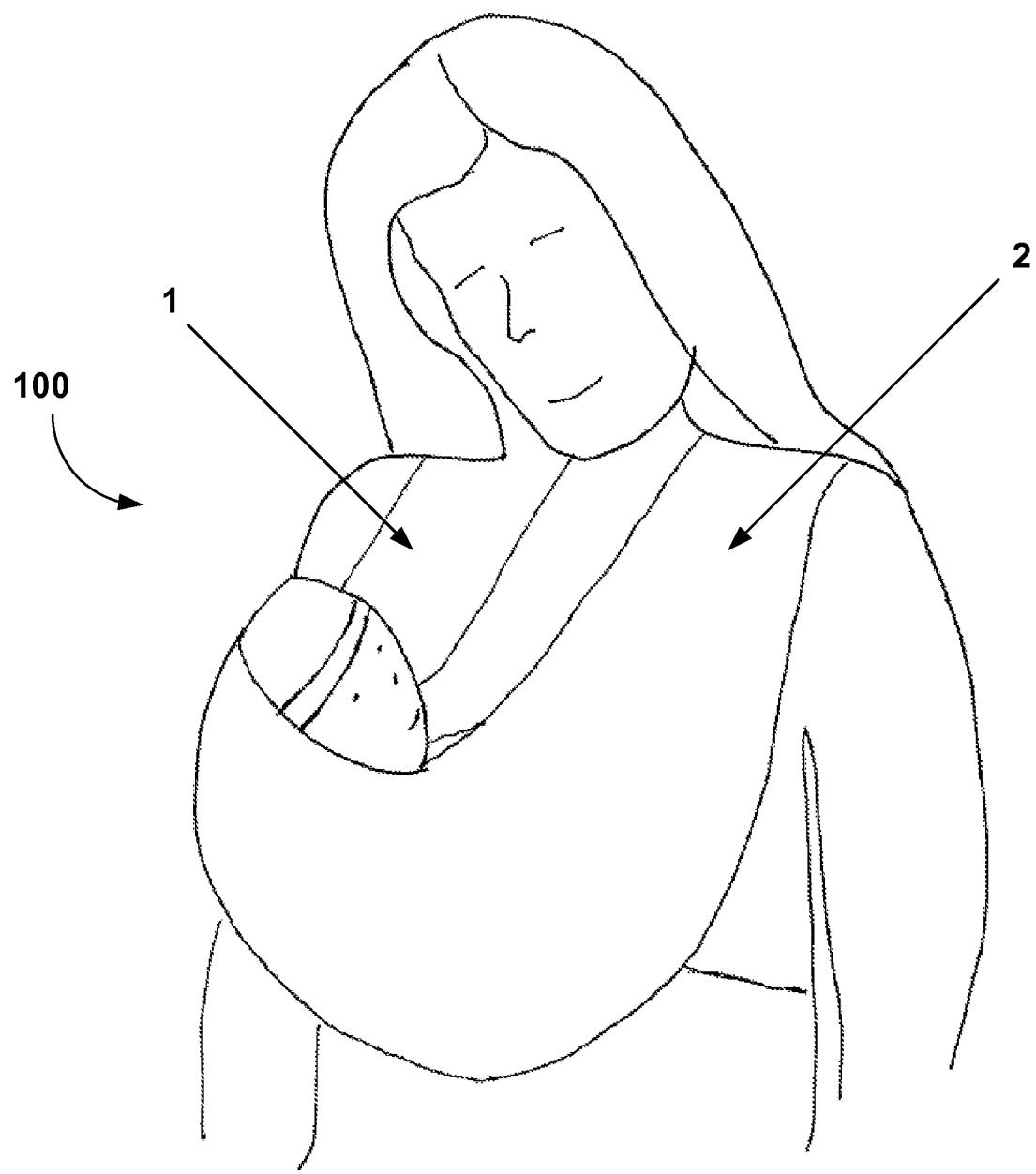
FIG. 7 illustrates an exemplary embodiment of a method of the present invention for carrying a child in a fully cradled position.
Figure 8:
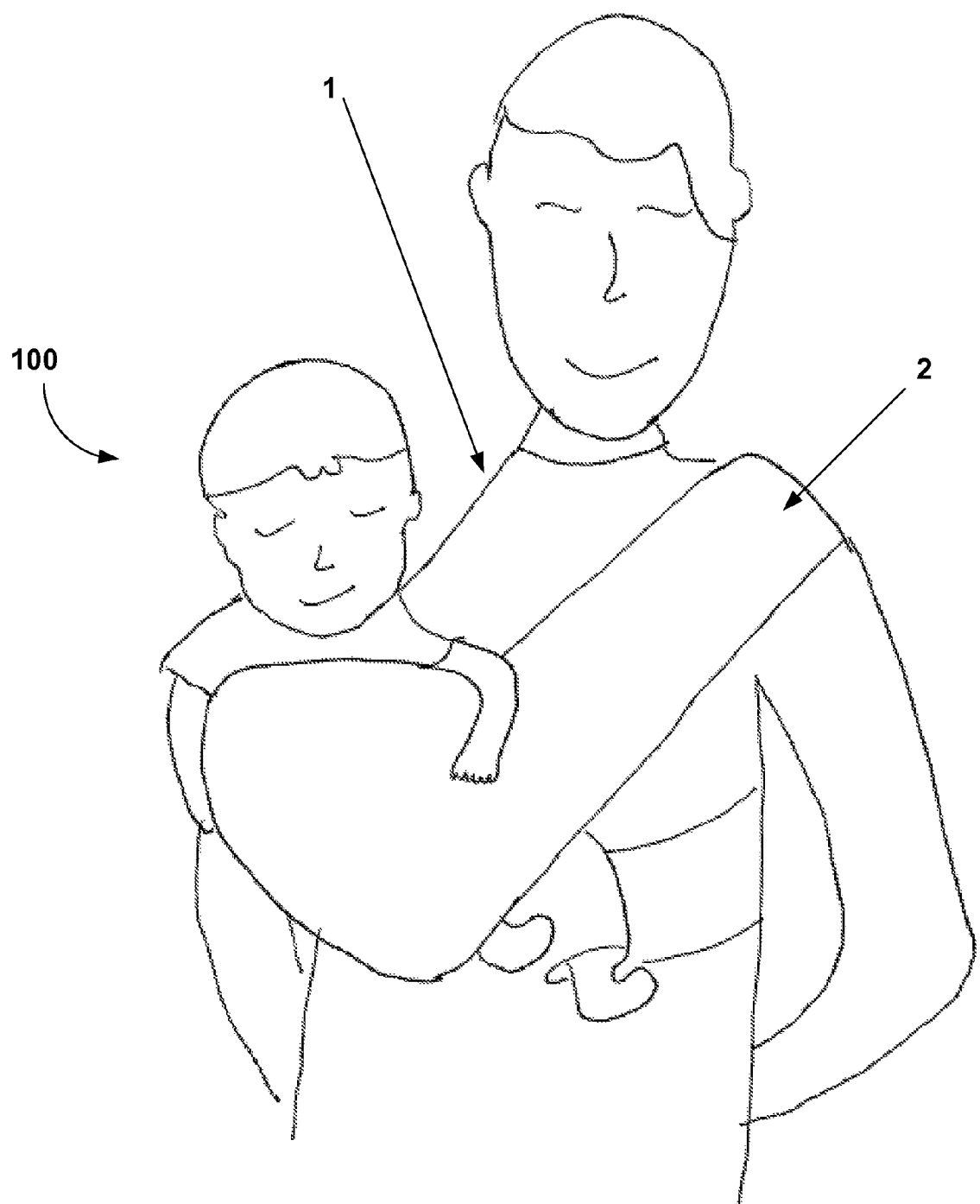
FIG. 8 illustrates an exemplary embodiment of a method of the present invention for carrying a child in a partially cradled position.

FIGS. 7 and 8 illustrate positions wherein the child is fully or partially cradled in the loops 1, 2. In FIG. 7 the child is fully cradled in the loops 1, 2. These positions are achieved by wearing first loop 1 across the right shoulder and under the left arm, and the second loop 2 across the left shoulder and under the left arm. As noted above, the positioning of the loops on the right or left shoulders can be alternated. The child is placed in the first loop 1 such that the head, torso, arms, and legs are supported by the loop 1, with the child's head at or near the user's chest/breast, and the child's legs near the user's waist. The second loop 2 is adjusted over the child's legs, bottom and back, so that the front overlap region 5 supports part of the child and secures the child to the user's body. This provides added security for the child as compared to a traditional one-shoulder sling, and added comfort and back support for the user because the loops cross at the user's back, rather than resting the weight load on one shoulder. The full head and neck support provided by this position is preferable for carrying newborns and infants, and allows for easy and discrete nursing or feeding. In addition, an infant or child can be discreetly nursed in public, such as in restaurants, parks, malls and similar public places, while being carried hands-free in the cradle position. The wide width of fabric of each loop is beneficial because it hides the nursing child from public view, and provides a unique barrier for the infant or child to outside stimulation while nursing, lending to less distractions while nursing. In addition, because the child can be carried on the right or left side of the user's body, the infant or child can nurse on one of his/her mother's breasts and then the mother can switch the child's position to enable the child to nurse from the other breast. The cradle position also provides infants with a comforting womb-like position where they can listen to the sound of the user's heartbeat. This position may also be employed for carrying an animal, preferably a small to medium sized pet.

FIG. 8 illustrates a child in a partially cradled (seated) position at the front of the user's torso. This position is achieved in substantially the same manner as the fully cradled position. However, when placing the child in the first loop 1, the head is free of the fabric and one or both of the child's arms may be free as well. This position is preferable for older or more energetic children since it is less confining and allows for a greater degree of movement and allows the child to observe the environment around him/her. Yet, at the same time, there is no material between the child's legs, which could potentially unnaturally spread the child's legs apart. This position may also be employed for carrying a small to medium sized animal. Animals typically prefer the freedom of movement and sights offered by this position. Animals may face inward toward the user or outward in this position.

The present invention, particularly the cradle and partial cradle positions, depicted in FIGS. 7 and 8 respectively, allow more than one small animal or one infant to be carried at one time. Two or more small animals, such as for example, tea cup dogs, puppies or kittens, can be carried at once in the pocket of the loop at the front of the user's torso. Twins or two infants could possibly be carried at once, with one small infant cradled in the inner loop at one side of the front of the user's torso, and the other small infant cradled in the outer loop at the other side of the front of the user's torso. This potential alternate embodiment is especially useful for parents of twins. A sash 4 is preferably then tied around the user and the two infants for added security and back support. Most wearable carriers can not be used to carry more than one animal or child securely at the same time.

Figure 9:
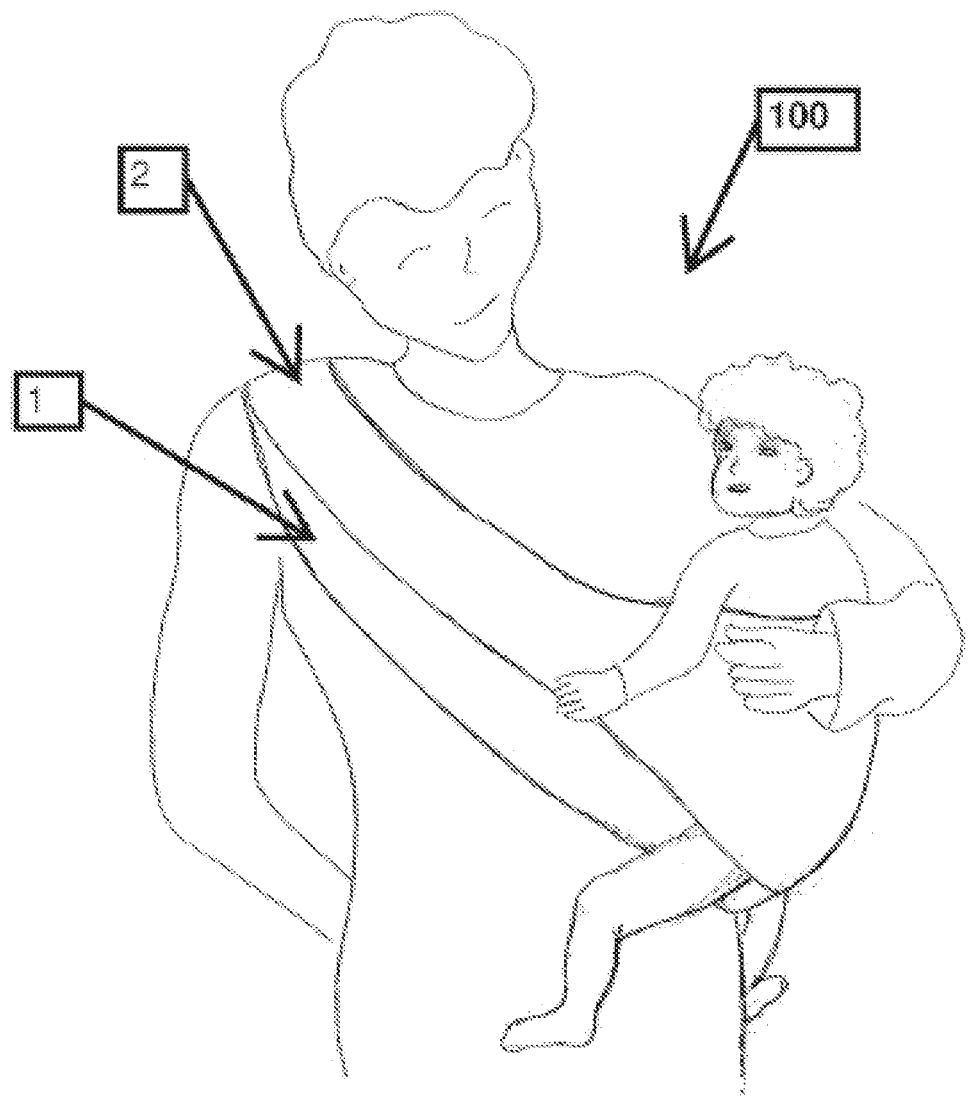
FIG. 9 illustrates an exemplary embodiment of a method of the present invention for carrying a child on the hip.

FIG. 9 illustrate a position wherein the child is held on the hip. This position is achieved by passing loops 1, 2 across the same shoulder and under the opposite arm. In this position the loops 1, 2 are parallel and do not crisscross. The child is placed in both the loops 1, 2, and the weight supported against the user's hip. The child can be placed in the loops 1, 2 in a variety of ways. Preferably the child is placed in the loops 1, 2 so that his/her legs straddle the user's side and his/her bottom and back are supported by the loops 1, 2. This position should only be employed when the child is able to sit upright unassisted. This position may also be employed for carrying an animal. An animal can be placed in the loops 1, 2 in any manner to user determines is safe and comfortable. This position is preferable for larger children and animals. The child or animal can be kept to the user's side and will not get in the way of performing tasks. Also, a large portion of the weight is supported by the user's hip, relieving possible strain on the back from carrying a heavy load.

Figure 10:
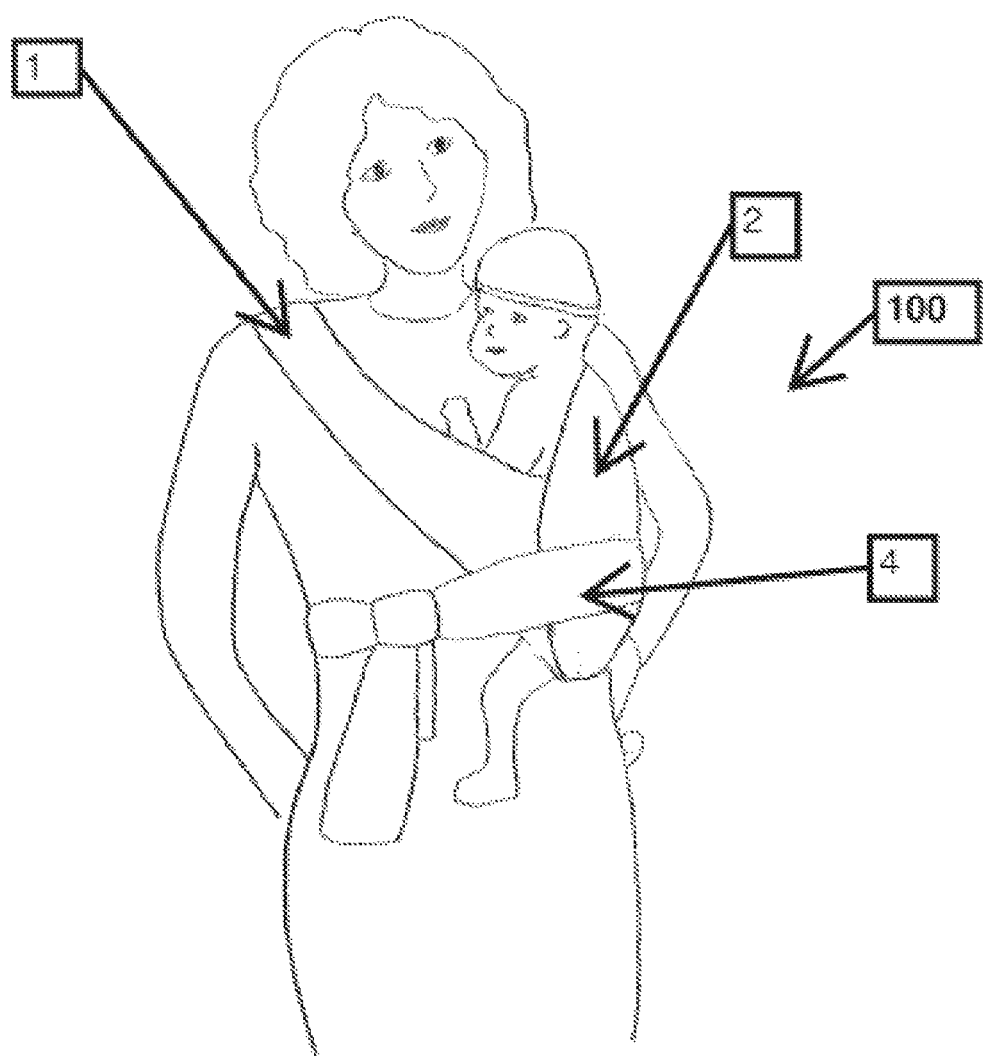
FIG. 10 illustrates an exemplary embodiment of a method of the present invention for carrying a child on the hip with a sash.

FIG. 10 illustrates an alternative embodiment of the position wherein the child is carried on the hip depicted in FIG. 9. This position is achieved in substantially the same manner as the position described in relation to FIG. 10. This position, however, requires the additional step of wrapping a sash 4 around the user and the child. The sash 4 is preferably wrapped around the user's torso and the torso of the child. A sash is tied in a knot on the front of the user's torso. In other contemplated embodiments, sash 4 may be wrap around different portions of the child such as the bottom, legs, shoulders, torso, or any combination of said portions. In further contemplated embodiments, the knot may be tied in different positions such as the user's side. In further embodiments, the sash 4 may wrap around the user and child more than once before being tied in a knot.

Figure 11:
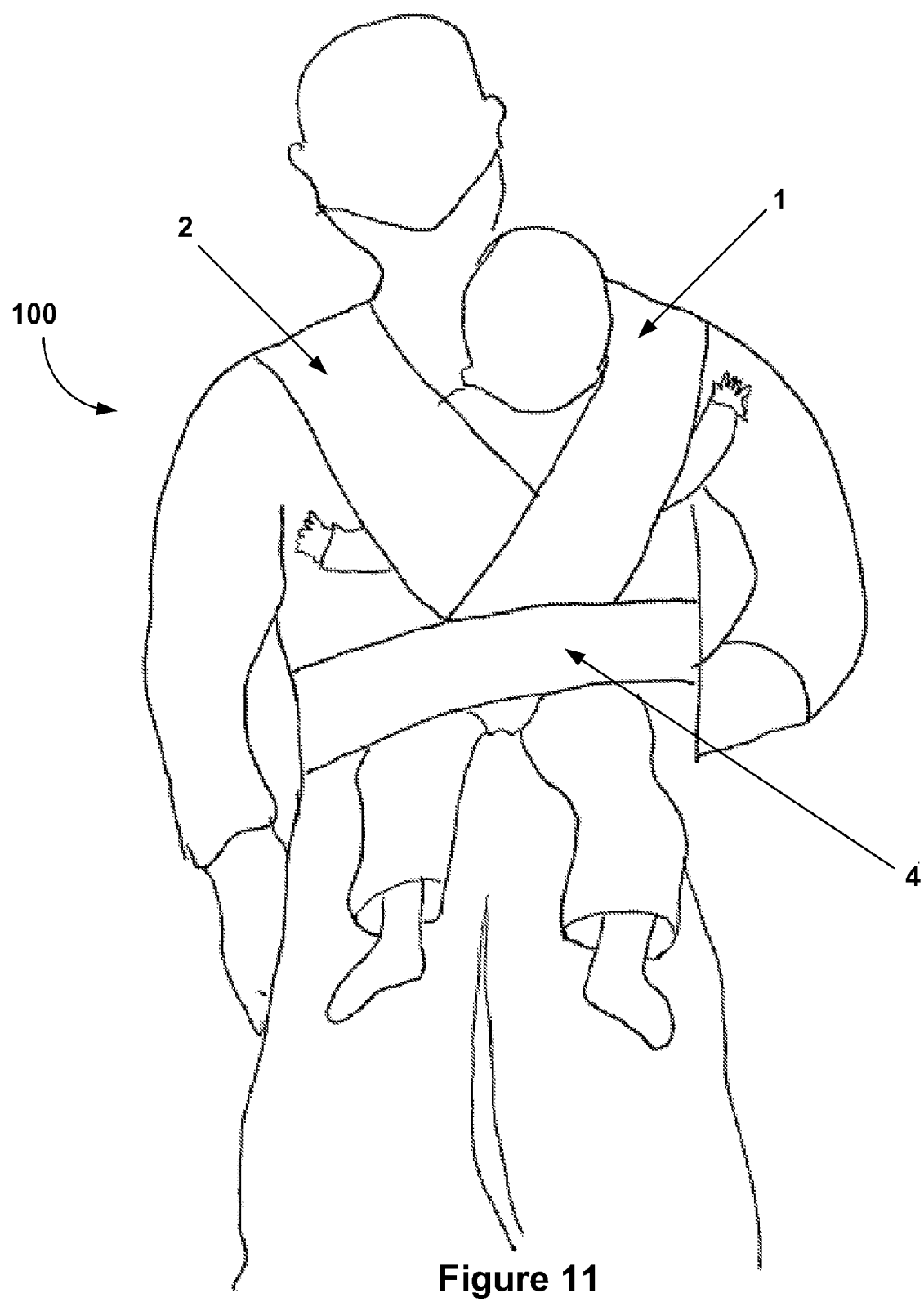
FIG. 11 illustrates an exemplary embodiment of a method of the present invention for carrying a child on the back.

FIG. 11 illustrates an alternative embodiment of the inward facing position described and depicted in FIG. 6. This position is achieved in the same manner as the position in FIG. 6, with exception that the child faces the back of the users torso rather than the front.

Figure 12:
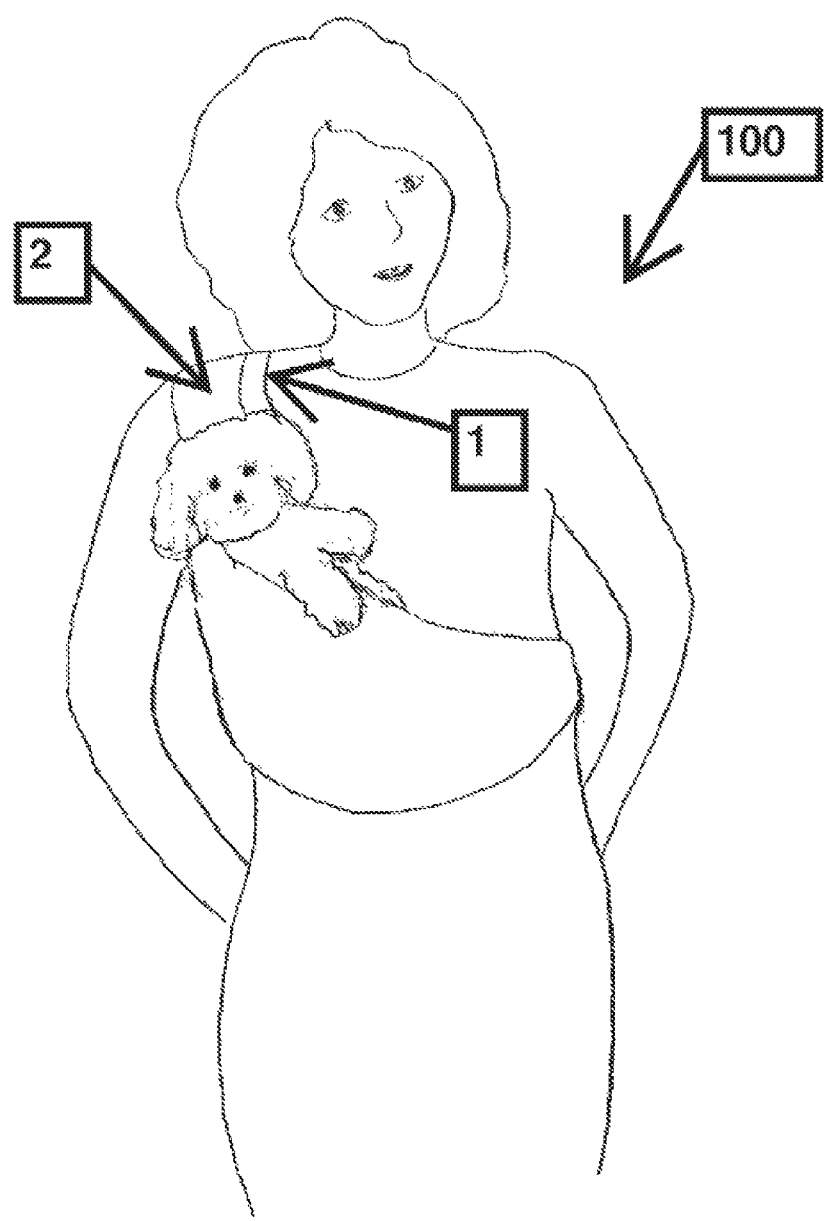
FIG. 12 illustrates an exemplary embodiment of a method of the present invention for carrying an animal in a partially cradled position.

FIG. 12 illustrates an alternative embodiment of the partially cradled position described and depicted in FIG. 8. This position is achieved in the same manner as the position in FIG. 8, with the exception that an animal is cradled in the loops 1, 2 rather than a child. In contemplated embodiments, the animal is a pet such as a dog with may be wrapped in the loops 1, 2 such that the animal's head and front paws are not preferably not covered by the fabric.

While the invention has been disclosed in its preferred forms, it will be apparent to those skilled in the art that many modifications, additions, and deletions can be made therein without departing from the spirit and scope of the invention and its equivalents, as set forth in the following claims.

The invention claimed is:

1. A method of carrying a child or animal, comprising:
   a. placing the child or animal in a carrier, the carrier comprising:
      a first continuous loop of material having a width;
      a second continuous loop of material having a width; and
      a free-standing connecting device made of a fabric material, wherein the first continuous loop and the second continuous loop pass through an aperture defined within the connecting device;
      wherein each of the first and second continuous loops have a width in portions adjacent to the placed child or animal so that the child or animal can be cradled within at least one of the continuous loops; and
   b. manipulating the connecting device to adjust the carrier.

2. The method of claim 1, wherein the first and second continuous loops are free-standing relative to each other.

3. The method of claim 1, wherein each of the first and second continuous loops are wide enough along their entire length so that the child or animal can be securely cradled within one of the loops.

4. The method of claim 1, wherein the first continuous loop is adapted to pass over a right shoulder and underneath a left arm of a user, and the second continuous loop is adapted to pass over a left shoulder of the user and over the first continuous loop at a front overlap region located on a front side of the user's torso and underneath a right arm of the user and over the first continuous loop at a rear overlap region located on a rear side of the user's torso, and the connecting device is adapted to communicate with the first continuous loop and the second continuous loop along the rear overlap region.

5. The method of claim 1, wherein the first continuous loop is adapted to pass over a left shoulder and underneath a right arm of a user, and the second continuous loop is adapted to pass over a right shoulder of the user and over the first continuous loop at a front overlap region located on a front side of the user's torso and underneath a left arm of the user and over the first continuous loop at a rear overlap region located on a rear side of the user's torso, and the connecting device is adapted to communicate with the first continuous loop and the second continuous loop along the rear overlap region.

6. The method of claim 1, wherein the first continuous loop is adapted to pass over a right shoulder and underneath a left arm of a user, and the second continuous loop is adapted to pass over a left shoulder of the user and over the first continuous loop at a back overlap region located on a back side of the user's torso and underneath a right arm of the user and over the first continuous loop at a front overlap region located on a front side of the user's torso, and the connecting device is adapted to communicate with the first continuous loop and the second continuous loop along the front overlap region.

7. The method of claim 1, wherein the first continuous loop is adapted to pass over a left shoulder and underneath a right arm of a user, and the second continuous loop is adapted to pass over a right shoulder of the user and over the first continuous loop at a back overlap region located on a back side of the user's torso and underneath a left arm of the user and over the first continuous loop at a front overlap region located on a front side of the user's torso, and the connecting device is adapted to communicate with the first continuous loop and the second continuous loop along the front overlap region.

8. A method of carrying a child or animal, comprising:
   a. placing the child or animal in a carrier worn by a user, the carrier comprising:
      a first continuous loop of fabric material having a substantially uniform width along its entire length;
      a second continuous loop of fabric material having a substantially uniform width along its entire length; and
      a free-standing connecting device made of a fabric material, wherein the first continuous loop and the second continuous loop pass through an aperture defined within the connecting device;
      wherein each of the first and second continuous loops have substantially uniform width such that the placed child or animal can be cradled within at least one of the continuous loops without regard to the orientation of the continuous loops worn by a user; and wherein the first continuous loop and the second continuous loop are separate, free-standing loops adapted to crisscross one another at a rear side of a user's torso and within the connecting device; and b. lifting the cradled child or animal by pulling down on the connecting device.

9. A method of carrying a child or animal, comprising:

a. placing the child or animal in a carrier, the carrier comprising:

a first continuous loop of fabric material having a width;

a second continuous loop of fabric material having a width; and a free-standing connecting device made of a continuous loop of fabric material, wherein the first continuous loop and the second continuous loop pass through an aperture defined within the connecting device;

wherein each of the first and second continuous loops are wide enough in portions in proximity to the placed child or animal that the child or animal can be securely cradled within at least one of the continuous loops; and wherein the connecting device has no buckles, clasps, snaps, rings, button, or metal or plastic hardware; and b. single-handedly manipulating the connecting device to adjust the carrier without unduly disturbing the child or animal.

10. The method of claim 1, wherein manipulating the connecting device to adjust the carrier comprises lifting the cradled child or animal by pulling down on the connecting device.

11. The method of claim 1, wherein the first and second continuous loops are formed of the same fabric material.

12. The method of claim 1, wherein the connecting device is a continuous loop of fabric material.

13. The method of claim 1, wherein the first and second continuous loops and the connecting device are made of the same fabric material.

14. The method of claim 8, wherein the first and second continuous loops are formed of the same fabric material.

15. The method of claim 8, wherein the connecting device is a continuous loop of fabric material.

16. The method of claim 8, wherein the first and second continuous loops and the connecting device are made of the same fabric material.

17. The method of claim 9, wherein the first and second continuous loops are formed of the same fabric material.

18. The method of claim 9, wherein the first and second continuous loops and the connecting device are made of the same fabric material.

* * * * *